(12) United States Patent
Shin et al.

(10) Patent No.: US 10,964,985 B2
(45) Date of Patent: Mar. 30, 2021

(54) BATTERY MODULE HOUSING TO WHICH ELECTROMAGNETIC PULSE BONDING TECHNOLOGY IS APPLIED AND METHOD FOR MANUFACTURING SAME

(71) Applicant: LG CHEM, LTD., Seoul (KR)

(72) Inventors: Eun-Gyu Shin, Daejeon (KR); Tai-Jin Jung, Daejeon (KR); Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 95 days.

(21) Appl. No.: 16/562,060

(22) Filed: Sep. 5, 2019

(65) Prior Publication Data

US 2019/0393456 A1 Dec. 26, 2019

Related U.S. Application Data

(63) Continuation of application No. PCT/KR2018/009836, filed on Aug. 24, 2018.

(30) Foreign Application Priority Data

Sep. 26, 2017 (KR) .................. 10-2017-0124419

(51) Int. Cl.
*H01M 50/20* (2021.01)
*H01M 10/48* (2006.01)

(52) U.S. Cl.
CPC ......... *H01M 50/20* (2021.01); *H01M 10/482* (2013.01)

(58) Field of Classification Search
None
See application file for complete search history.

(56) References Cited

U.S. PATENT DOCUMENTS

| 9,472,797 B2 | 10/2016 | Han et al. |
| 2013/0086961 A1 | 4/2013 | Yablochnikov et al. |

(Continued)

FOREIGN PATENT DOCUMENTS

| CN | 105789501 A | 7/2016 |
| CN | 106505169 A | 3/2017 |

(Continued)

OTHER PUBLICATIONS

English translation of CN 105789501 A published on Jul. 20, 2016.

(Continued)

*Primary Examiner* — Wyatt P McConnell
(74) *Attorney, Agent, or Firm* — Birch, Stewart, Kolasch & Birch, LLP (57) ABSTRACT

A battery module housing having a rectangular tube structure and method for forming the battery module housing is provided. The battery module housing includes a first side plate and a second side plate, the first and second side plates having target portions at upper and lower ends thereof, respectively, and spacers vertically protruding from the target portions; and a top plate and a bottom plate disposed upper and lower portions of the first and second side plates, respectively, each of the top and bottom plates having flyer portions supported on the spacers of the first and second side plates. The flyer portions of the top and bottom plates are joined to the target portions by means of electromagnetic pulse welding such that outer portions of the flyer portions contact the target portions and inner portions of the flyer portions are separated from the target portions by a gap.

15 Claims, 11 Drawing Sheets

(56) References Cited

U.S. PATENT DOCUMENTS

| | | |
|---|---|---|
| 2016/0175979 A1 | 6/2016 | Gwon et al. |
| 2016/0380251 A1 | 12/2016 | Kim et al. |
| 2017/0190264 A1 | 7/2017 | Kim et al. |
| 2018/0138565 A1 | 5/2018 | Lee et al. |
| 2018/0183023 A1 | 6/2018 | Qin et al. |
| 2018/0287102 A1 | 10/2018 | Ullmann |

FOREIGN PATENT DOCUMENTS

| | | |
|---|---|---|
| JP | 2012-104414 A | 5/2012 |
| JP | 2015-125798 A | 7/2015 |
| JP | 2016-167350 A | 9/2016 |
| KR | 10-1340010 B1 | 12/2013 |
| KR | 10-2015-0026768 A | 3/2015 |
| KR | 10-1674348 B1 | 11/2016 |
| KR | 10-2017-0002139 A | 1/2017 |
| KR | 10-2017-0036639 A | 4/2017 |
| KR | 10-2017-0082041 A | 7/2017 |
| KR | 10-2017-0083834 A | 7/2017 |
| WO | WO 2016/207027 A1 | 12/2016 |

OTHER PUBLICATIONS

Supplementary European Search Report dated May 25, 2020 in EP 18860515.8.
International Search Report (PCT/ISA/210) issued in PCT/KR2018/009836, dated Dec. 11, 2018.

BATTERY MODULE HOUSING TO WHICH ELECTROMAGNETIC PULSE BONDING TECHNOLOGY IS APPLIED AND METHOD FOR MANUFACTURING SAME

CROSS-REFERENCE TO RELATED APPLICATIONS

The present application is a By-Pass Continuation of International Application PCT/KR2018/009836, filed Aug. 24, 2018, which claims priority to Korean Patent Application No. 10-2017-0124419, filed on Sep. 26, 2017, in the Korean Intellectual Property Office, the disclosures of which are incorporated herein in their entirety by reference.

TECHNICAL FIELD

The present disclosure relates to a battery module housing, and more particularly, to a battery module housing having a structure capable of positioning components to be assembled and setting an initial gap between preforms to be joined during an electromagnetic pulse (EMP) welding process without a separate jig, and a method for manufacturing the battery module housing.

BACKGROUND ART

A battery module may include a plurality of battery cells stacked in one direction and having electrode leads electrically connected in series and/or in parallel, and a battery module housing for housing and packaging the battery cells.

The battery module housing provides a mechanical supporting force to the battery cells, which may have insufficient mechanical rigidity, and serves as a case for protecting the battery cells against external impacts. The battery module housing may be manufactured in various shapes according to the particulars of the battery module. Recently, as disclosed in KR Unexamined Patent Publication No. 10-2017-0083834 (Jul. 19, 2017), the battery module housing is frequently fabricated as a rectangular tube structure, which is called a mono-frame.

The mono-frame may be fabricated integrally by extrusion or die casting, or may be fabricated by combining top and bottom plates and two side plates in a snap-fitting, bolting or welding manner.

Here, if the mono-frame is fabricated using the snap-fitting manner or the bolting manner, while the assembling process is simple, due to the durability and the increased number of components, it is difficult to change the design of the mono-frame and the cost increases. Recently, the mono-frame is fabricated integrally by die casting or fabricated by joining four plates by welding.

Meanwhile, in recent years, a solid-state welding technology has attracted attention among the welding techniques.

In the solid-state welding technology the melting of a preform is prevented or suppressed as much as possible to preserve the original characteristics of the preform and minimize the occurrence of defects at a welded region, thereby maximizing the characteristics of the integrated parts. Along with the development of new metal materials, such as composite materials, and the growth of high-tech industries, the solid-state welding technology is highly spotlighted, and thus it becomes possible to weld materials having complicated shapes or those requiring high quality and high precision, which have been not able to be welded using the existing fusion welding technology.

An electromagnetic pulse (EMP) may be used to weld preforms of a battery module housing, as one of the solid-state welding technologies. In the EMP welding technology, an induced current is generated at one preform due to the high current instantaneously flowing through a coil, and the shape of the preform is deformed due to Lorentz force causing the preform to collide with another preform at high speed, thereby welding the preforms.

In order to perform the EMP welding, it is necessary to generate an induced current at one end portion of a top plate in a state where one end portion of the top plate, which corresponds to a preform to be welded, is separated from an upper end portion of a side plate at a predetermined interval. At this time, a separate positioning and initial gap setting jig is used to set the interval constantly, but this is not an efficient solution. Meanwhile, when the EMP welding is performed, since the induced current has a low density at opposite ends of the preform, the Lorentz force is insufficient at opposite ends of the preform and thus the collision speed is low at opposite ends of the preform. For this reason, the corresponding portion frequently remains in a non-welded state. The non-welded region is very vulnerable to external impacts and may easily cause cracks in the battery module housing. Thus, there is demanded a method for eliminating the non-welded region while performing the EMP welding more easily to the battery module housing.

DISCLOSURE

Technical Problem

The present disclosure is designed to solve the problems of the related art, and therefore the present disclosure is directed to providing a battery module housing having a flyer and target structure, which may apply an EMP welding technology requiring an initial gap between preforms to be welded to weld the battery module housing without a separate jig, and a method for manufacturing the battery module housing.

However, the objects of the present disclosure are not limited to the above, and objects not mentioned herein may be clearly understood from the present specification by those skilled in the art.

Technical Solution

In one aspect of the present disclosure, there is provided a battery module housing having a rectangular tube structure in which an inner space for accommodating battery cells is formed, the battery module housing comprising: a first side plate and a second side plate disposed upright to face each other, the first side plate and the second side plate having target portions provided at an upper end and a lower end thereof, respectively, and spacers vertically protruding from the target portions; and a top plate and a bottom plate disposed horizontally at an upper portion and a lower portion of the first side plate and the second side plate, respectively, each of the top plate and the bottom plate having flyer portions supported on respective spacers of the first side plate and the second side plate. The flyer portions of the top plate and the bottom plate may be welded to respective target portions of the first and second side plates by means of EMP welding such that outer portions of the flyer portions contact the respective target portions and inner portions of the flyer portions are separated from the respective target portions by a gap.

The flyer portions may be provided at opposite ends of the top plate and the bottom plate, and each of the top plate and the bottom plate may include a cover portion formed between respective flyer portions, each of the cover portions has a greater thickness than the respective flyer portions, and each of the cover portions may be fitted into a space between the respective spacer of the first side plate and the respective spacer of the second side plate to be positioned with respect to the first side plate and the second side plate.

Each spacer may be provided at side edge of the target portion that is closest to the inner space.

A step may be formed between each of the flyer portions and the cover portion of the top plate and the bottom plate, and each spacer may have a rectangular cross section to be in surface contact with respective stepped surfaces of the top plate and the bottom plate.

A first side portion of the spacer, which is oriented toward the inner space, may have a round structure and is in contact with the respective cover portion.

A second side portion of the spacer, which is opposite to the first side portion, may have a chamfer structure.

Each flyer portion may include a non-welded region, which extends beyond an end of the target portion before the EMP welding is performed, and thus is not welded with the target portion, and a notch located adjacent the end of the target portion, the notch may be configured to cause the non-welded region to be cut off due to an impact when the EMP welding is performed.

In another aspect of the present disclosure, there is also provided a method for manufacturing a battery module housing that has a rectangular tube structure in which an inner space for accommodating battery cells is formed, the method comprising: a preparation step of providing a first side plate, a second side plate, a top plate and a bottom plate, each of the first side plate and the second side plate having target portions provided at an upper end and a lower end thereof, respectively, when the first side plate and second side plate are upright, and spacers vertically protruding from the target portions, and each of the top plate and the bottom plate having flyer portions formed at opposite ends thereof; a positioning step in which the first side plate and the second side plate are disposed upright to face each other, and the top plate and the bottom plate are disposed horizontally at an upper portion and a lower portion of the first side plate and the second side plate, respectively, such that the flyer portions of the top plate and the bottom plate are supported by the spacers of the first side plate and the second side plate to define a gap between the target portions and the flyer portions while facing the target portions; and an EMP welding step of welding the flyer portions to the target portions by means of an electromagnetic force formed by an induced current at the flyer portions such that a portion of the gap remains between the target portions and the flyer portions.

Each of the top plate and the bottom plate may include a cover portion formed between respective flyer portions, and each of the cover portions may have a greater thickness than the respective flyer portions, and, in the positioning step, the cover portion may be fitted into a space between the respective spacer of the first side plate and the respective spacer of the second side plate to be positioned with respect to the first side plate and the second side plate.

Each flyer portion may include a non-welded region, which extends beyond an end of the target portion before the EMP welding step is performed, and thus is not welded with the target portion during the EMP welding step.

Each flyer portion may include a notch adjacent to the end of the target portion, and the non-welded region is cut off due to an impact when the EMP welding step is performed.

Advantageous Effects

According to an embodiment of the present disclosure, it is possible to provide a battery module housing having a flyer and target structure, which may apply an EMP welding technology requiring an initial gap between preforms to be welded to weld the battery module housing without a separate jig, and a method for manufacturing the battery module housing.

According to another embodiment of the present disclosure, it is possible to minimize that a crack occurs due to the collision of a flyer portion and a target portion and the gap increases due to the repulsive force, by means of the impact absorption of the spacer.

According to still another embodiment of the present disclosure, it is possible to improve the quality of welding since a non-welded region caused by insufficient induced current at opposite ends of the flyer portion does not remain between the flyer portion and the target portion.

The effects of the present disclosure are not limited to the above, and effects not mentioned herein may be clearly understood from the present specification and the accompanying drawings by those skilled in the art.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for a better understanding of the present disclosure, and thus the shape, size and the like of components may be exaggerated, omitted or simplified in the drawings for better understanding. Thus, the size and ratio of components in the drawings do not wholly reflect the actual size and ratio.

Figure 1:
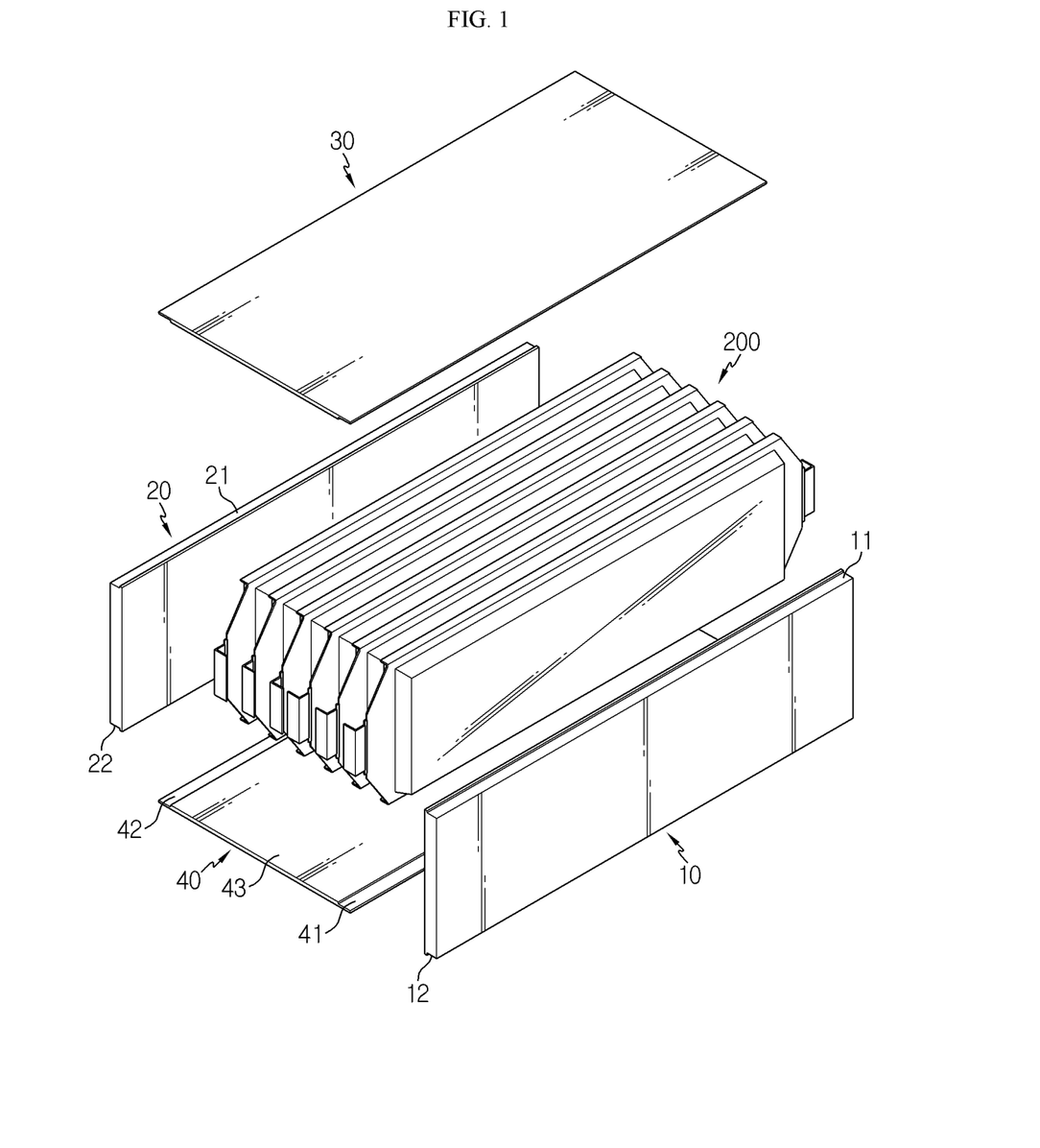
FIG. 1 is a schematic exploded perspective view showing a battery module housing according to an embodiment of the present disclosure.
Figure 2:
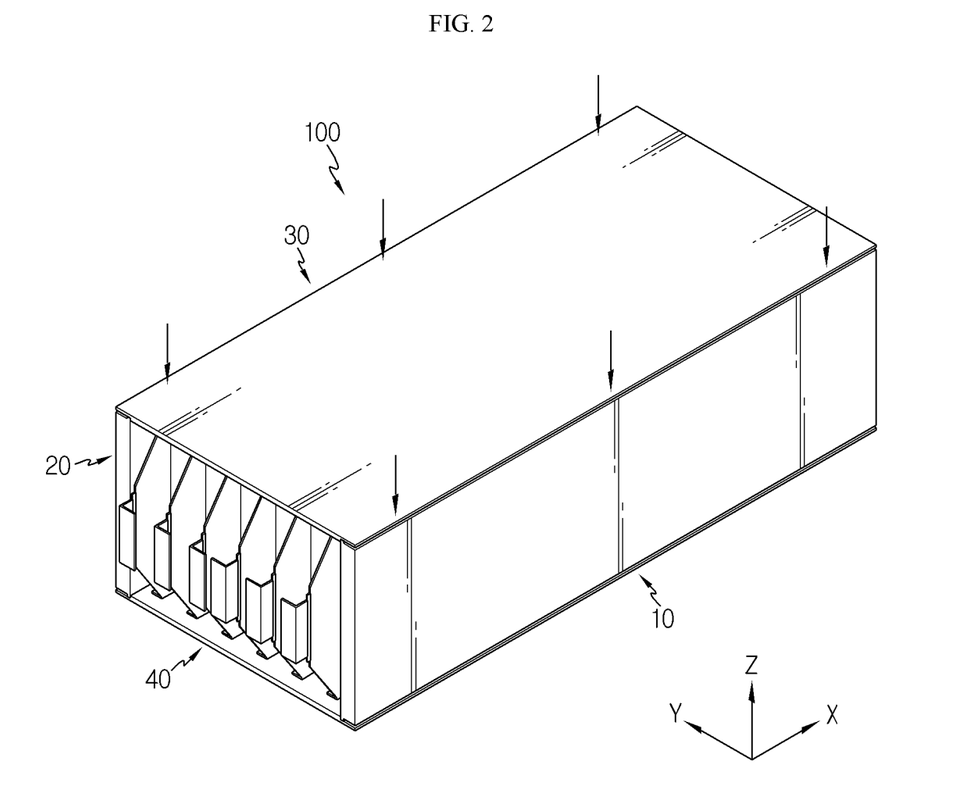
FIGS. 2 and 3 are perspective views showing the battery module housing according to an embodiment of the present disclosure before and after the EMP welding is performed.
Figure 3:
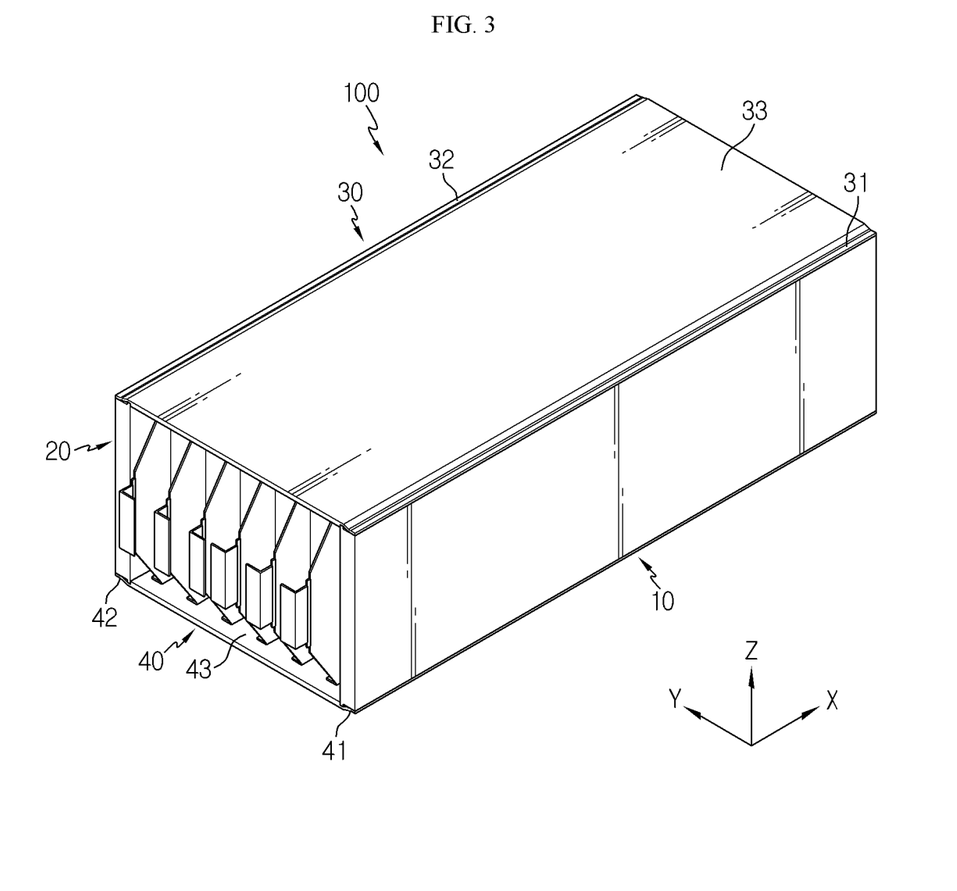
Figure 4:
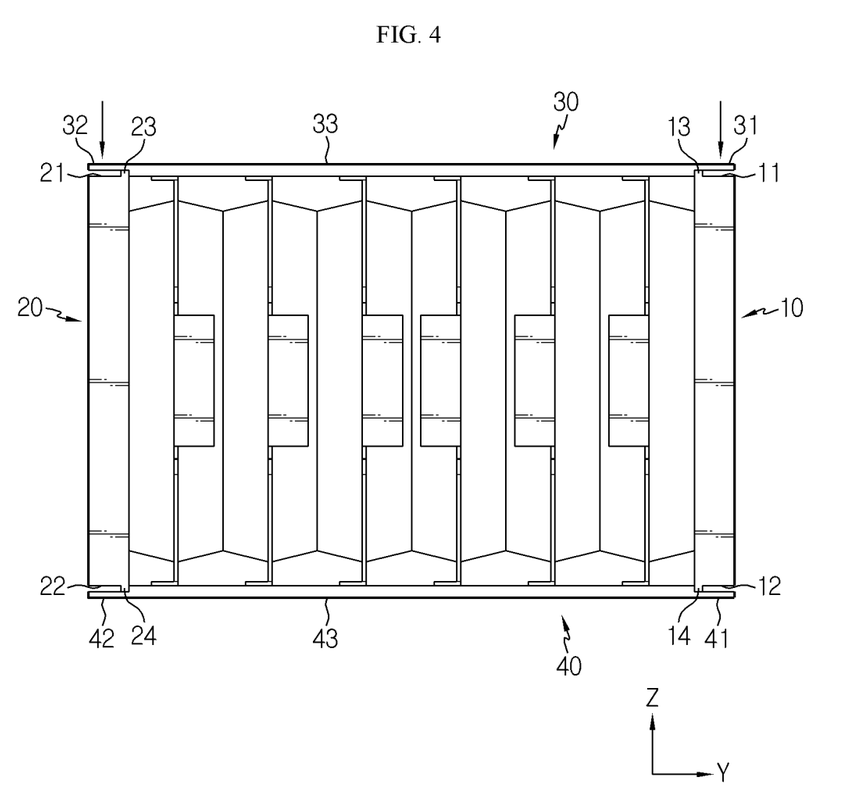
FIGS. 4 and 5 are cross-sectioned views showing the battery module housing according to an embodiment of the present disclosure before and after the EMP welding is performed.
Figure 5:
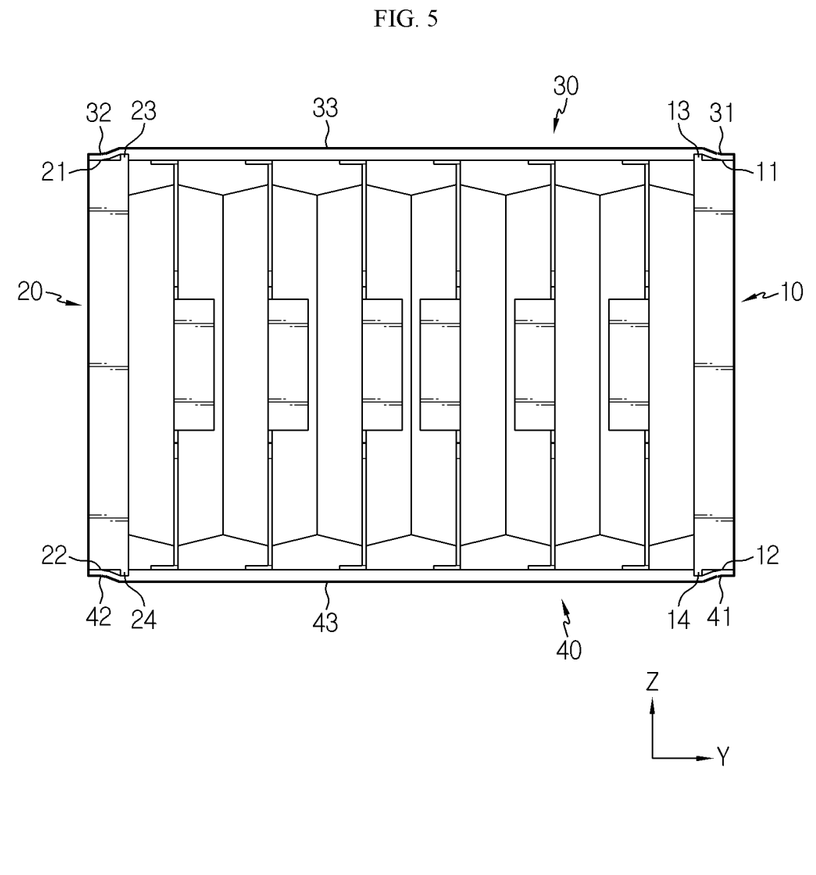

FIG. 1 is a schematic exploded perspective view showing a battery module housing according to an embodiment of the present disclosure, and FIGS. 2 and 3 are perspective views showing the battery module housing according to an embodiment of the present disclosure before and after the EMP welding is performed.

The battery module housing 100 of the present disclosure described below means a structure for accommodating battery cells 200 in an inner space thereof, but on occasions, the battery module housing 100 may be used for storing articles other than the battery cells.

For reference, the battery cells accommodated in the battery module housing 100 of the present disclosure may be pouch-type secondary batteries. In this case, the battery cells may be stacked in the horizontal direction or in the vertical direction and then accommodated in the battery module housing 100.

As shown in FIGS. 1 to 3, the battery module housing 100 includes first and second side plates 10, 20, which define opposite sides of the inner space, which is capable of accommodating a plurality of battery cells, and top and bottom plates 30, 40, which define upper and lower sides of the inner space.

The battery module housing 100 provides a mechanical supporting force to the accommodated battery cells and may serve to protect the battery cells against external impacts. Accordingly, the four plates 10, 20, 30, 40 constituting the battery module housing 100 may be made of a metal material to secure the rigidity.

In addition, the first and second side plates 10, 20 and the top and bottom plates 30, 40 are plane-type structures, and the four edges of the battery module housing 100 where the plates contact each other are welded by means of EMP welding so that the plates are integrated into a rectangular tube-shaped mono-frame.

If the EMP welding technology is applied to weld the four plates 10, 20, 30, 40 of the battery module housing 100, the plates may be welded in a low-temperature state without being melted, and thus it is possible to minimize the occurrence of defects at the four joined regions and maximize the characteristics of the integrated components.

As explained in more detail below, the battery module housing 100 of this embodiment may be designed so that an initial gap G of flyer portions 31, 32, 41, 42 corresponding to the welded region and target portions 11, 12, 21, 22 may be set when the EMP welding is performed. In this case, the welding preparation process is simple and easy, thereby reducing welding tolerances. Accordingly, the welding quality of the battery module housing may be improved.

Hereinafter, the four plates 10, 20, 30, 40 constituting the battery module housing 100 will be described in more detail with reference to FIGS. 4 to 7. In this embodiment, the first side plate 10 and the second side plate 20 have the same configuration mutually symmetrical to each other in the horizontal direction, and the top plate 30 and the bottom plate 40 have the same configuration mutually symmetrical to each other in the vertical direction. Thus, the same components will not be described repeatedly.

The first side plate 10 and the second side plate 20 may have the same thickness and shape, and the top plate 30 and the bottom plate 40 may also have the same thickness and shape. At this time, in order to increase the structural robustness of the battery module housing 100, it is preferable that the thicknesses of the first and second side plates 10, 20 are relatively greater than the thicknesses of the top and bottom plates 30, 40.

The first and second side plates 10, 20 according to the present disclosure have the target portions 11, 12, 21, 22, and the top and bottom plates 30, 40 have the flyer portions 31, 32, 41, 42, respectively.

The target portions 11, 12, 21, 22 may be defined as upper and lower ends of the first and second side plates 10, 20 when the first and second side plates 10, 20 are standing upright, and the flyer portions 31, 32, 41, 42 may be defined as both left and right ends of the top and bottom plates 30, 40 when the top and bottom plates 30, 40 are disposed horizontally.

Referring to FIGS. 2 to 5 again, the target portions 11, 12, 21, 22 may be defined as an upper end line and an lower end line of the first and second side plates 10, 20 along the longitudinal direction (the X-axis direction) of the battery module housing 100, and the flyer portions 31, 32, 41, 42 may be defined as opposite end lines of the top and bottom plates 30, 40 that face the target portions 11, 12, 21, 22 upward and downward, respectively.

The target portions 11, 12, 21, 22 and the flyer portions 31, 32, 41, 42 are welded to each other. Here, in a state where the flyer portions 31, 32, 41, 42 are located above or below the target portions 11, 12, 21, 22, the EMP welding technology may be applied so that the flyer portions 31, 32, 41, 42 collide with the target portions 11, 12, 21, 22 and thus the flyer portions 31, 32, 41, 42 and the target portions 11, 12, 21, 22 are welded together. At this time, the induced current may be formed only at the flyer portions 31, 32, 41, 42. As a result, outer portions of the flyer portions 31, 32, 41, 42 contact the target portions 11, 12, 21, 22 and inner portions of the flyer portions 31, 32, 41, 42 may be separated from the target portions 11, 12, 21, 22.

In particular, according to the present disclosure, as shown in FIGS. 4 to 7, the first and second side plates 10, 20 further include spacers 13, 14, 23, 24 protruding vertically from the target portions 11, 12, 21, 22, respectively. The spacers 13, 14, 23, 24 may be provided at one side edge of the target portions 11, 12, 21, 22, that is closes to the inner space of the battery module housing 100, and may have a rectangular cross section.

The spacers 13, 14, 23, 24 may serve to set an initial gap G between the flyer portions 31, 32, 41, 42 and the target portions 11, 12, 21, 22 for the EMP welding.

Figure 6:
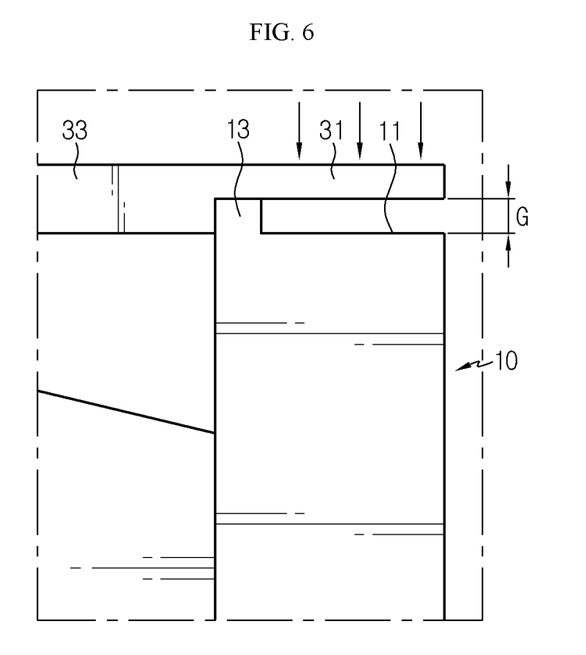
FIGS. 6 and 7 are partial expanded views showing main components of FIGS. 4 and 5.

For example, the spacer 13 is formed to protrude vertically by a predetermined interval from the target portion 11 at the upper end of the first side plate 10 to support the top plate 30, so that the gap G is present between the flyer portion 31 of the top plate 30 and the target portion 11 at the upper end of the first side plate 10, as shown in FIG. 6.

Figure 7:
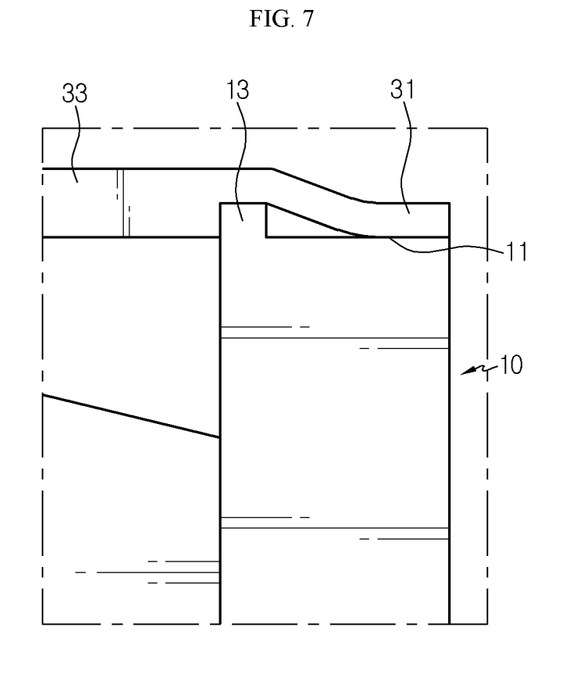

The gap G between the target portions 11, 12, 21, 22 and the flyer portions 31, 32, 41, 42 is a minimum gap G necessary for the EMP welding to occur. As shown in FIG. 7, only when the induced currents generated at the flyer portions 31, 32, 41, 42 in a state where the gap G is maintained will cause the flyer portions 31, 32, 41, 42 to collide with the target portions 11, 12, 21, 22 by the electromagnetic force to weld the flyer portions 31, 32, 41, 42 and the target portions 11, 12, 21, 22.

Meanwhile, the top and bottom plates 30, 40 may include cover portions 33, 43 that are formed thicker than the flyer portions 31, 32, 41, 42. The cover portions 33, 43 extend between the flyer portions 31, 32, 41, 42 respectively.

In the top plate 30 of this embodiment, the cover portion 33 is relatively thicker than the flyer portions 31, 32 at opposite ends thereof, and a step is formed between them so that a central region of the top plate 30 may be concave downward.

In addition, the spacers 13, 23 at the upper ends of the first and second side plates 10, 20 may have a rectangular shape so as to be in surface contact with the stepped surfaces of the flyer portions 31, 32 at opposite ends of the top plate 30 and the cover portion 33.

Thus, referring to FIGS. 4 and 6 again, the top plate 30 may be horizontally positioned on the upper portion of the first and second side plates 10, 20 as the cover portion 33 is fitted into the space between the spacer 13 of the first side plate 10 and the spacer 23 of the second side plate 10. Likewise, the bottom plate 40 may be positioned horizontally below the first and second side plates 10, 20.

As described above, if the cover portion 33 of the top plate 30 is fitted into the space between the spacers 13, 23 of the first and second side plates 10, 20, the top plate 30 is fixed with respect to the first and second side plates 10, 20, and simultaneously the initial gap G between the flyer portions 31, 32 at opposite ends of the tope plate 30 and the target portions 11, 21 of the first and second side plates 10, 20 is set.

Thus, in the present disclosure, the EMP welding may be performed immediately in this state. Thus, when the EMP welding is performed, a separate jig for setting a gap G between plates is not required.

In addition, since the positions of the top and bottom plates 30, 40 relative to the first and second side plates 10, 20 may be precisely aligned, the tolerance during the EMP welding may be reduced.

Next, a battery module housing 100 according to another embodiment of the present disclosure will be described with reference to FIGS. 8 and 9. The same reference signs as in the former embodiment denote the same or similar components, and the same or similar components will not be described in detail again, and features different from the former embodiment will be mainly described.

Figure 8:
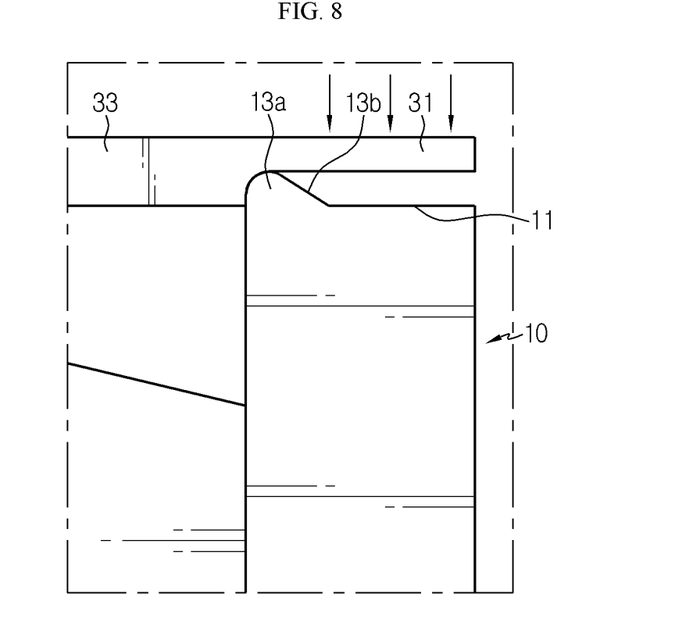
FIGS. 8 and 9 are partially expanded cross-sectioned views showing a battery module housing according to another embodiment of the present disclosure before and after the EMP welding is performed.
Figure 9:
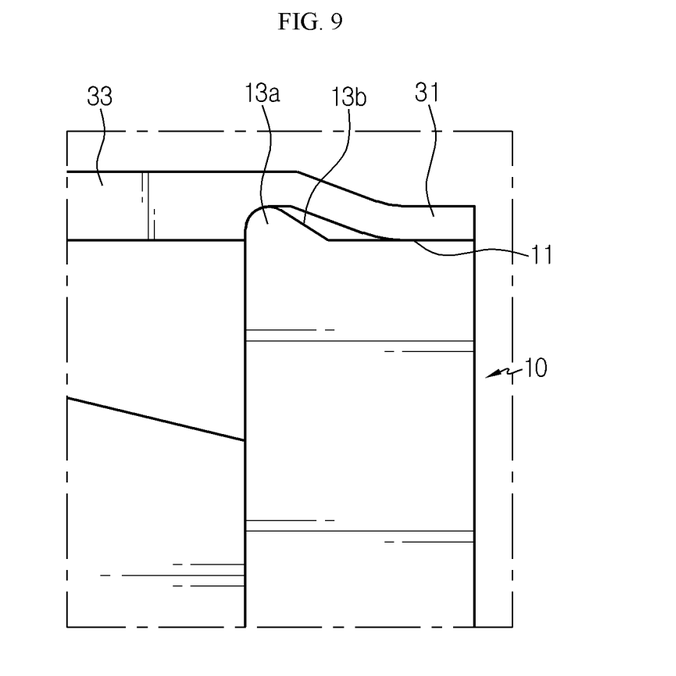

As shown in FIGS. 8 and 9, the spacers 13, 14, 23, 24 according to this embodiment of the present disclosure are configured so that one side portion 13a thereof oriented toward the inner space of the battery module housing 100 has a round structure and another side portion 13b thereof located opposite to the one side portion 13a has a chamfer structure.

As described previously, the spacer 13 of the earlier embodiment has a rectangular shape and is provided in surface contact with the top plate 30 at a right angle, so that the top plate 30 may be easily assembled in the space between the spacers 13, 23 and the top plate 30 may be stably fixed after being assembled. However, when the EMP welding is performed, cracks may occur and the spacers 13, 14, 23, 24 may be collapsed at impact.

Figure 10:
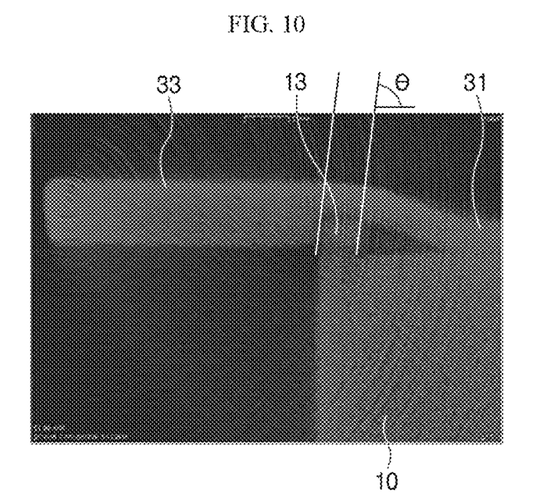
FIG. 10 is a reference view showing that the spacer is inclined due to an impact when the EMP welding is performed.

For example, referring to FIG. 10, the spacer 13 of the earlier embodiment having a rectangular shape may be collapsed obliquely by an angle θ in the welding direction of the flyer portion 31 and the target portion 11 due to the strong load caused by the deformation of the flyer portion 31. At this time, the corresponding portion of the top plate 30 which is in surface contact with the spacer 13 at a right angle may be cracked due to the impact.

Meanwhile, unlike the earlier embodiment, the spacers 13, 14, 23, 24 of this embodiment are configured so that one side portion 13a thereof has a round structure and is in contact with the cover portion 33 of the top plate 30 and the other side portion 13b located opposite to the one side portion 13a has a chamfer structure whose width gradually increases from the upper end to the lower end of the spacers 13, 14, 23, 24.

The one side portion 13a having a round structure mitigates the impact during the EMP welding, thereby preventing a crack from occurring at a portion of the top plate 30 that is in contact with the one side portion 13a and preventing the space from increasing.

In addition, since the width of the other side portion 13b having a chamfer structure gradually increases from the upper end to the lower end, even though a load is applied thereto when the flyer portion 31 is deformed, the other side portion 13b may not be snapped or collapsed in the welding directing of the flyer portion 31 and the target portion 11.

Accordingly, the battery module housing 100 according to this embodiment having the spacers 13, 14, 23, 24 may prevent the formation of a crack around the spacers 13, 14, 23, 24, the space increases, or the collapse of the spacers 13, 14, 23, 24 due to an impact during the EMP welding, thereby improving the structural robustness and the welding reliability of the battery module housing 100.

Next, another embodiment of the present disclosure will be described with reference to FIGS. 11 to 15.

Figure 11:
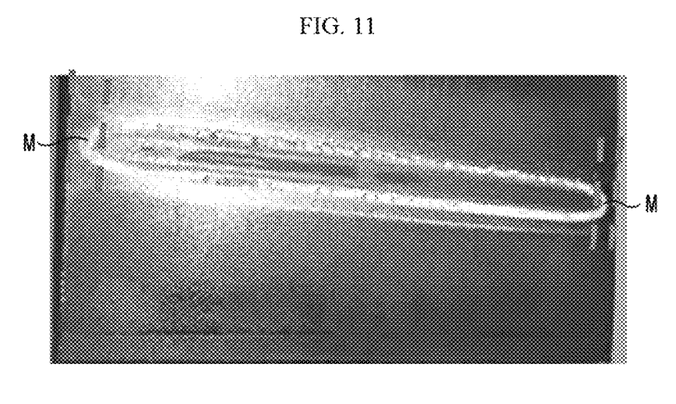
FIG. 11 is a reference view showing a sample to which the EMP welding is performed.

First, FIG. 11 shows a sample to which the EMP welding technology is applied in which opposite ends of the sample remain in a non-welded state M. This may occur because the density of the induced current by the coil is lowest at opposite ends of the preform, so that the Lorentz force and resultant the collision speed are not sufficient.

Referring to FIGS. 12 to 15, in a still another embodiment of the present disclosure, the flyer portions 31, 32, 41, 42 of the top and bottom plates 30, 40 before the electromagnetic pulse welding (as indicated by L in FIG. 14) may include non-welded regions 31a, 32a, 41a, 42a that extend beyond the target portions 11, 12, 21, 22 of the first side plate 10 and the second side plate 20 so as not to face the target portions 11, 12, 21, 22 and thus are not welded. For example, the non-welded regions 31a, 32a, 41a, 42a may preferably be formed in the length of about 1 to 2 mm.

Figure 12:
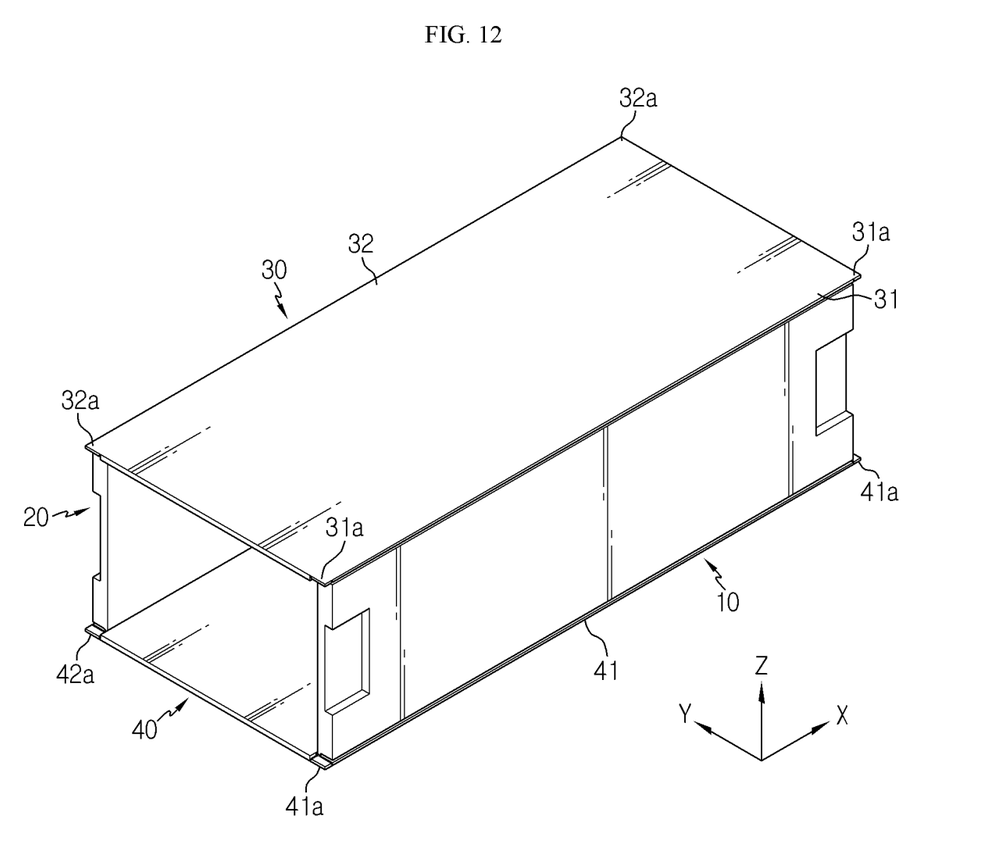
FIGS. 12 and 13 are perspective views showing the battery module housing according to another embodiment of the present disclosure before and after the EMP welding is performed.
Figure 13:
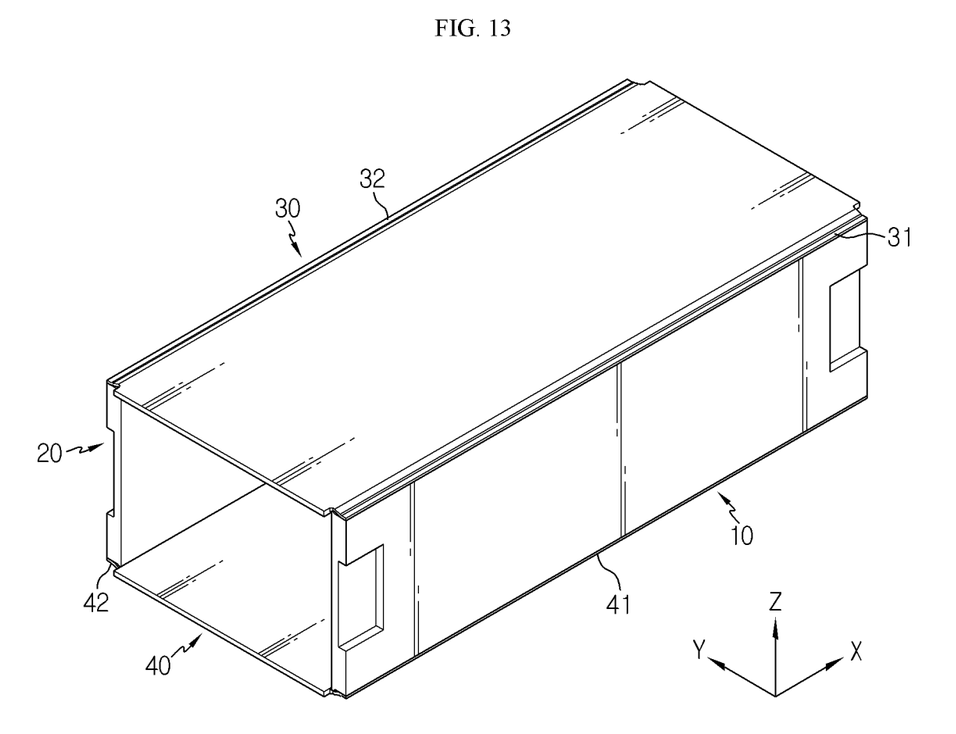

In other words, as shown in FIG. 12, the non-welded regions may be provided at opposite ends of the flyer portions 31, 32, 41, 42, and the induced current may be insufficiently formed during the EMP welding at the non-welded regions. In this consideration, in this embodiment, the other regions of the flyer portions 31, 32, 41, 42 except for the non-welded regions 31a, 32a, 41a, 42a may have the same length as the target portions 11, 12, 21, 22.

In other words, the other regions of the flyer portions 31, 32, 41, 42 except for the non-welded regions 31a, 32a, 41a, 42a face the entire regions of the target portions II, 12, 21, 22, thereby securing a sufficient density of the induced current during the EMP welding. Thus, since the other regions of the flyer portions 31, 32, 41, 42 except for the non-welded regions 31a, 32a, 41a, 42a and the entire regions of the target portions 11, 12. 21, 22 may be completely welded, it is possible to improve the welding quality of the battery module housing 100.

Meanwhile, in the top and bottom plates 30, 40, the non-welded regions 31a, 32a, 41a, 42a may not only interfere with other components but also cause adverse effects such as cracks when an external impact is applied thereto, and, thus, it is preferable to remove the non-welded regions 31a, 32a, 41a, 42a. Thus, as in FIGS. 14 and 15, a notch 31b is formed at opposite end portions of the flyer portions 31, 32, 41, 42 of this embodiment to induce the non-welded regions 31a, 32a, 41a, 42a to be cut off by an impact when the EMP welding is performed.

Figure 14:
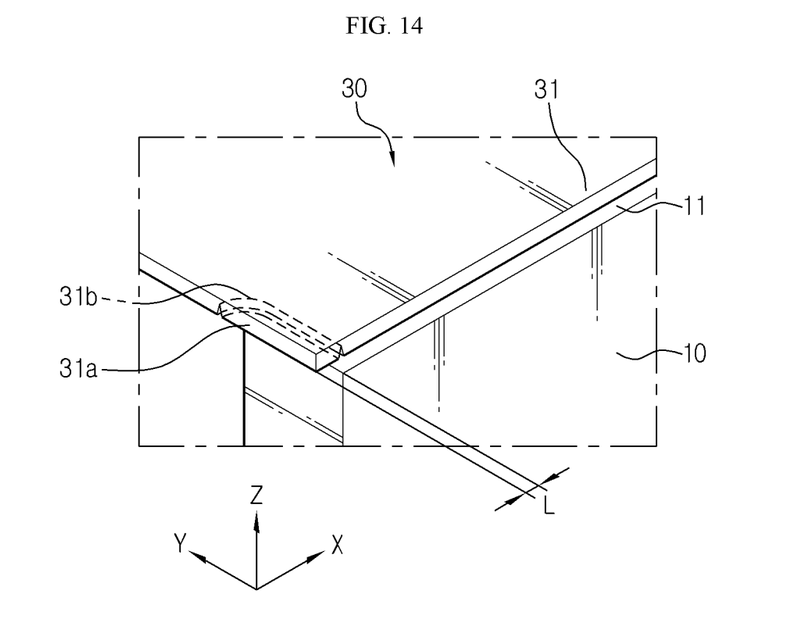
FIGS. 14 and 15 are partial expanded views showing main components of FIGS. 12 and 13.
Figure 15:
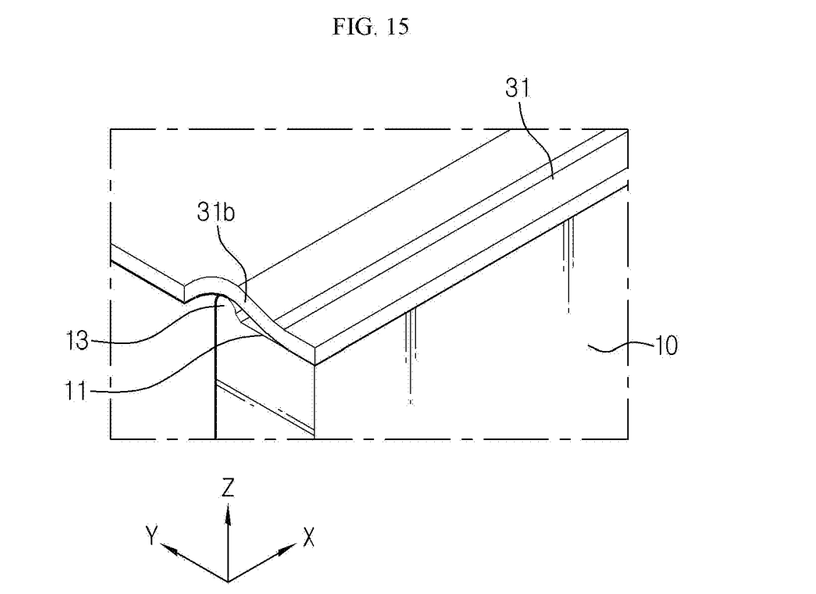

One notch 31b may be formed at each corners of the battery module housing 100, and thus four notches may be formed. More specifically, the notches 31b may be provided at the boundary lines between the non-welded sections and the welded sections of the flyer portions 31, 32, 41, 42, and the boundary lines may be aligned with the edge lines of the target portions 11, 12, 21, 22.

If the notches of this embodiment are used, it is possible to easily remove the unnecessary non-welded regions 31a, 32a, 41a, 42a from the battery module housing 100.

Figure 16:
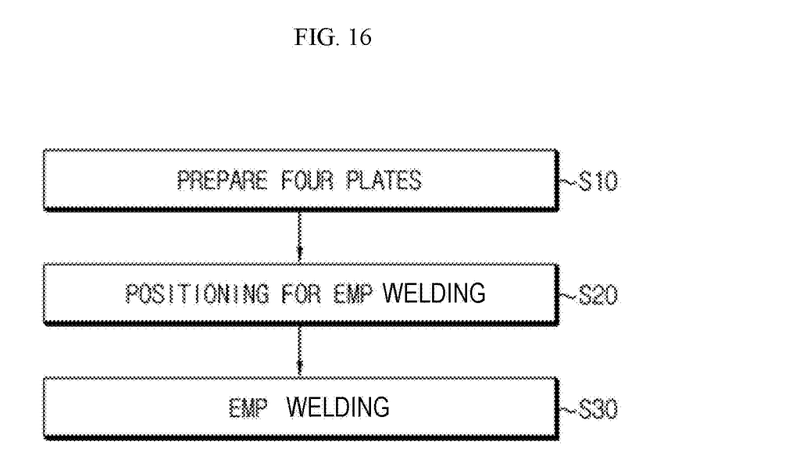
FIG. 16 is a flowchart for illustrating a method for manufacturing a battery module housing according to an embodiment of the present disclosure.

Next, a method for manufacturing the battery module housing 100 according to the present disclosure will be described with reference to FIG. 16 along with FIGS. 1 to 7.

The method for manufacturing the battery module housing 100 according to the present disclosure includes a preparation step (S10) of providing the first and second side plates 10, 20 and the top and bottom plates 30, 40 described above, a positioning step (S20) of disposing the four plates so that the initial gap G is set between the flyer portions 31, 32, 41, 42 and the target portions 11, 12, 21, 22, and an EMP welding step (S30) of welding the flyer portions 31, 32, 41, 42 to the target portions 11, 12, 21, 22 by forming an induced current at the flyer portions 31, 32, 41, 42.

More specifically, first, the first and second side plates 10, 20 and the top and bottom plates 30, 40 constituting the battery module housing 100 are prepared. At this time, the flyer portions 31, 32, 41 42 of the top and bottom plates 30, 40 may be provided to have a greater length than the target portions 11, 12, 21, 22 of the first and second side plates 10, 20 by about 1 to 2 mm.

After that, the first and second side plates 10, 20 are disposed upright to face each other, and the top plate 30 is disposed horizontally with respect to the first and second side plates 10, 20. Here, the flyer portions 31, 32 are supported by the spacers 13, 23 of the first and second side plates 10, 20 to maintain the gap G with the target portions 11, 21 of the first and second side plates 10, 20 while facing the target portions 11, 21.

At this time, the cover portion 33 of the top plate 30 is fitted into the spaces between the spacers 13, 23 at the upper ends of the first and second side plates 10, 20, so that the top plate 30 is placed on the spacers 13, 23 of the first and second side plates 10, 20 to be horizontally supported thereon. In addition, the flyer portions 31, 32 corresponding to opposite ends of the top plate 30 are disposed to set the initial gap G with the target portions 11, 21 of the first and second side plates 10, 20 for the EMP welding.

In this state, an EMP welding device is used to form an induced current on the flyer portions 31, 32 at opposite sides along the longitudinal direction (the X-axis direction) of the top plate 30. At this time, the flyer portions 31, 32 of the top plate 30 may be strongly collided with and welded to the target portions 11, 21 of the first and second side plates 10, 20 due to the electromagnetic force (Lorentz force).

After that, the bottom plate 40 is positioned with respect to the first and second side plates 10, 20 by being fitted into the space between the spacers 14, 24 at the lower ends of the first and second side plates 10, 20, similar to the top plate 30. Then, EMP welding is performed to the flyer portions 41, 42 of the bottom plate 40 and the target portions 12, 22 at the lower ends of the first and second side plates 10, 20, thereby manufacturing the battery module housing 100 in which the four plates 10, 20, 30, 40 are integrated into a rectangular tube shape.

According to the present disclosure having the above configuration and operations, since the initial gap G of the flyer portions 31, 32, 41, 42 corresponding to the welded region and the target portions 11, 12, 21, 22 is already set in the structure of the battery module housing 100, when the EMP welding is performed, there is no need for a separate jig to set the initial gap G. Thus, the welding process of the battery module housing 100 may be simplified, thereby reducing the tolerance.

In addition, according to the present disclosure, it is possible to minimize the occurrence of a crack due to an impact during the EMP welding and the increase of the gap due to a repulsive force, thereby increasing the structural robustness of the battery module housing 100.

Moreover, since a non-welded region formed between the flyer portions 31, 32, 41, 42 and the target portions 11, 12, 21, 22 due to an insufficient induced current at opposite ends of the flyer portions 31, 32, 41, 42 is eliminated, the welding process may be performed more completely.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A battery module housing having a rectangular tube structure in which an inner space for accommodating battery cells is formed, the battery module housing comprising:
    a first side plate and a second side plate disposed upright to face each other, the first side plate and the second side plate having target portions provided at an upper end and a lower end thereof, respectively, and spacers vertically protruding from the target portions; and
    a top plate and a bottom plate disposed horizontally at an upper portion and a lower portion of the first side plate and the second side plate, respectively, each of the top plate and the bottom plate having flyer portions supported on respective spacers of the first side plate and the second side plate, wherein the flyer portions of the top plate and the bottom plate are welded to respective target portions of the first and second side plates by means of electromagnetic pulse (EMP) welding such that outer portions of the flyer portions contact the respective target portions and inner portions of the flyer portions are separated from the respective target portions by a gap.

2. The battery module housing according to claim 1, wherein the flyer portions are provided at opposite ends of the top plate and the bottom plate, and wherein each of the top plate and the bottom plate includes a cover portion formed between respective flyer portions, each of the cover portions has a greater thickness than the respective flyer portions, and each of the cover portions is fitted into a space between the respective spacer of the first side plate and the respective spacer of the second side plate to be positioned with respect to the first side plate and the second side plate.

3. The battery module housing according to claim 2, wherein a step is formed between each of the flyer portions and the cover portion of the top plate and the bottom plate, and wherein each spacer has a rectangular cross section to be in surface contact with respective stepped surfaces of the top plate and the bottom plate.

4. The battery module housing according to claim 2, wherein a first side portion of each spacer, which is oriented toward the inner space, has a round structure and is in contact with the respective cover portion.

5. The battery module housing according to claim 4, wherein a second side portion of the spacer, which is opposite to the first side portion, has a chamfer structure.

6. The battery module housing according to claim 1, wherein each flyer portion includes:
    a non-welded region, which extends beyond an end of the target portion before the EMP welding is performed, and thus is not welded with the target portion, and
    a notch located adjacent the end of the target portion, the notch being configured to cause the non-welded region to be cut off due to an impact when the EMP welding is performed.

7. The battery module housing according to claim 1, wherein each spacer is provided at a side edge of the target portion that is closest to the inner space.

8. A method for manufacturing a battery module housing having a rectangular tube structure in which an inner space for accommodating battery cells is formed, the method comprising:
    a preparation step of providing a first side plate, a second side plate, a top plate and a bottom plate, each of the first side plate and the second side plate having target portions provided at an upper end and a lower end thereof, respectively, when the first side plate and the second side plate are upright, and spacers vertically protruding from the target portions, and each of the top plate and the bottom plate having flyer portions formed at opposite ends thereof;
    a positioning step in which the first side plate and the second side plate are disposed upright to face each other, and the top plate and the bottom plate are disposed horizontally at an upper portion and a lower portion of the first side plate and the second side plate, respectively, such that the flyer portions of the top plate and bottom plate are supported by the spacers of the first side plate and the second side plate to define a gap between the target portions and the flyer portions while facing the target portions; and
    an electromagnetic pulse (EMP) welding step of welding the flyer portions to the target portions by means of an electromagnetic force formed by an induced current at the flyer portions such that a portion of the gap remains between the target portions and the flyer portions.

9. The method for manufacturing a battery module housing according to claim 8,
    wherein each of the top plate and the bottom plate includes a cover portion formed between respective flyer portions, and each of the cover portions has a greater thickness than the respective flyer portions, and
    wherein in the positioning step, the cover portion is fitted into a space between the respective spacer of the first side plate and the respective spacer of the second side plate to be positioned with respect to the first side plate and the second side plate.

10. The method for manufacturing a battery module housing according to claim 9,
    wherein a step is formed between each of the flyer portions and the cover portion of the top plate and the bottom plate, and
    wherein each spacer has a rectangular cross section to be in surface contact with respective stepped surfaces of the top plate and the bottom plate.

11. The method for manufacturing a battery module housing according to claim 9,
    wherein a first side portion of each spacer, which is oriented toward the inner space, has a round structure and is in contact with the respective cover portion.

12. The method for manufacturing a battery module housing according to claim 11,
    wherein a second side portion of the spacer, which is opposite to the first side portion, has a chamfer structure.

13. The method for manufacturing a battery module housing according to claim 8,
    wherein each flyer portion includes a non-welded region, which extends beyond an end of the target portion before the EMP welding step is performed, and thus is not welded with the target portion during the EMP welding step.

14. The method for manufacturing a battery module housing according to claim 13,
    wherein each flyer portion includes a notch adjacent the end of the target portion, and
    wherein the non-welded region is cut off due to an impact when the EMP welding step is performed.

15. The method for manufacturing a battery module housing according to claim 8,
    wherein each spacer is provided at a side edge of the target portion that is closest to the inner space.

* * * * *